(12) United States Patent
Akaki et al.

(10) Patent No.: US 8,141,904 B2
(45) Date of Patent: Mar. 27, 2012

(54) ENERGY ABSORBING STRUCTURE FOR A VEHICLE

(75) Inventors: Hiroyuki Akaki, Aki-gun (JP); Hideto Yamada, Aki-gun (JP); Soukichi Kikuchi, Aki-gun (JP); Osami Ohno, Aki-gun (JP)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/708,489

(22) Filed: Feb. 18, 2010

(65) Prior Publication Data

US 2010/0194145 A1  Aug. 5, 2010

Related U.S. Application Data

(63) Continuation-in-part of application No. 12/473,898, filed on May 28, 2009, now Pat. No. 8,002,064.

(30) Foreign Application Priority Data

Aug. 21, 2008 (JP) ................................. 2008-213099

(51) Int. Cl.
 *B62D 21/00* (2006.01)
(52) U.S. Cl. .......................... 280/784; 180/312; 280/781
(58) Field of Classification Search ............... 180/89.12, 180/232, 274, 311, 312; 280/781, 784, 124.145, 280/124.154; 296/187.08, 187.09, 193.05, 296/193.07, 193.09, 204; *B62D 21/02, 21/09, B62D 21/15*
See application file for complete search history.

(56) References Cited

U.S. PATENT DOCUMENTS

| | | | |
|---|---|---|---|
| 1,514,981 A | 11/1924 | Merville | |
| 1,552,702 A | 9/1925 | Irish | |
| 1,652,357 A | 12/1927 | Harper | |
| 1,737,177 A | 11/1929 | Schantz | |
| 1,982,105 A | 11/1934 | Hughs | |
| 2,136,122 A | 11/1938 | Einar | |
| 2,384,096 A | 9/1945 | Kishline | |
| 2,403,145 A * | 7/1946 | Ulrich | 296/193.09 |
| 2,549,102 A | 4/1951 | Kramer | |
| 2,769,656 A | 11/1956 | Lee | |
| 3,101,809 A | 8/1963 | Hostetler et al. | |
| 3,177,031 A | 4/1965 | Schilberg | |
| 3,554,596 A | 1/1971 | Le Fevre | |
| 4,203,499 A | 5/1980 | Miyata | |

(Continued)

FOREIGN PATENT DOCUMENTS

GB         2390581 A       6/2003
(Continued)

*Primary Examiner* — Paul N Dickson
*Assistant Examiner* — Laura Freedman
(74) *Attorney, Agent, or Firm* — Gigette M. Bejin; Fredrick V. Owens

(57) ABSTRACT

A frontal collision energy absorbing structure includes a pair of left and right main frames. A front cross member and a rear cross member each connect the left and right main frames. A suspension tower and an engine mount bracket may each be attached to each main frame. Each front suspension tower is spaced out from the joint between the front cross member and the main frame. Each rear suspension tower is spaced out from the joint between the rear cross member and the main frame. Each of engine mount bracket is longitudinally spaced apart from the following joints: the front cross member and the main frame; the rear cross member and the main frame, and the suspension tower and the main frame.

4 Claims, 11 Drawing Sheets

U.S. PATENT DOCUMENTS

| | | | |
|---|---|---|---|
| 5,308,115 A | 5/1994 | Ruehl et al. | |
| 5,385,369 A * | 1/1995 | Mukai et al. | 280/788 |
| 5,409,283 A | 4/1995 | Ban | |
| 5,561,902 A * | 10/1996 | Jacobs et al. | 29/897.2 |
| 5,685,599 A * | 11/1997 | Kitagawa | 296/204 |
| 5,897,139 A * | 4/1999 | Aloe et al. | 280/781 |
| 5,915,727 A * | 6/1999 | Bonnville | 280/788 |
| 6,398,262 B1 * | 6/2002 | Ziech et al. | 280/785 |
| 6,428,046 B1 * | 8/2002 | Kocer et al. | 280/781 |
| 6,439,608 B1 | 8/2002 | Bonnville | |
| 6,733,021 B1 * | 5/2004 | Ziech et al. | 280/124.109 |
| 6,733,040 B1 | 5/2004 | Simboli | |
| 6,866,295 B2 * | 3/2005 | Ziech et al. | 280/785 |
| 6,874,816 B2 * | 4/2005 | Herrmann et al. | 280/781 |
| 7,207,600 B2 * | 4/2007 | Beckmann et al. | 280/781 |
| 7,461,890 B2 * | 12/2008 | Yatsuda | 296/203.02 |
| 7,559,402 B2 * | 7/2009 | Jennings et al. | 180/312 |
| 7,703,805 B2 * | 4/2010 | Sasaki et al. | 280/784 |
| 7,762,619 B2 * | 7/2010 | Baccouche et al. | 296/187.09 |
| 7,802,816 B2 * | 9/2010 | McGuire | 280/788 |
| 7,862,085 B2 * | 1/2011 | Xu et al. | 280/800 |
| 7,959,170 B2 * | 6/2011 | Mauz | 280/124.135 |
| 2010/0045072 A1 * | 2/2010 | Yamada et al. | 296/204 |
| 2010/0194145 A1 | 8/2010 | Akaki et al. | |

FOREIGN PATENT DOCUMENTS

| | | | |
|---|---|---|---|
| JP | 06127429 A * | 5/1994 | |
| JP | 06329049 A | 11/1994 | |
| JP | 2000272537 A | 10/2000 | |
| JP | 2002-205662 | 7/2002 | |
| WO | WO 2004/002808 | 1/2004 | |

* cited by examiner

ENERGY ABSORBING STRUCTURE FOR A VEHICLE

RELATED PATENT APPLICATIONS

The patent application is a continuation-in-part of U.S. patent application bearing the Ser. No. 12/473,898, filed on May 28, 2009 which, in turn, claims priority to Japanese Patent Application No 2008-213099 filed on Aug. 21, 2008.

BACKGROUND

The present disclosure relates to an energy absorbing structure for a vehicle with a chassis frame.

It has been known that a ladder-shaped chassis frame is provided with a vehicle called a small truck or a sport utility vehicle, for example as described in GB 2390581A or WO 2004/002808. The chassis frame is formed in a ladder shape by a pair of left and right main frames (also called side frames) extending in a vehicle longitudinal direction (i.e. vehicle front and rear direction) and multiple cross members connecting the left main frame to the right main frame.

The main frame is provided with an engine mount bracket for mounting an engine, a cab mount bracket for mounting a vehicular body component which may include a cabin which carries passengers and cargo.

Further, a pair of suspension towers may be attached to a front portion of the main frames to support a top portion of a strut of the front suspension, as described in GB 2390581A or WO 2004/002808.

A suspension tower, an engine mount bracket and at least one cross member would be attached to the front portion of the main frame. A front cross member is traditionally provided frontward of the suspension tower. The front cross member traditionally supports the front and inner end of an A-type lower arm of the front suspension. A rear cross member is traditionally provided rearward of the suspension tower. The rear cross member traditionally supports the rear and inner end of the A-type lower suspension arm. The suspension tower, the engine mount bracket and the front and rear cross members would be attached to the main frame within a relatively narrow range in the vehicle longitudinal direction. Given that suspension tower and the engine mount bracket, together with the main frames, may not easily deform in the vehicle longitudinal direction, the aforementioned components may not readily absorb energy during a vehicular front collision. On the other hand, lengthening the main frame may be restricted by a predetermined vehicle overall length. Therefore, the main frame may not adequately absorb energy and deform in the vehicle longitudinal direction.

Accordingly in the past, vehicle structures, such as but not limited to the suspension tower and the cross member, have overlapped one another in the vehicle longitudinal direction.

However, where multiple vehicle structures, such as but not limited to a suspension tower and cross member overlap each other in the vehicle longitudinal direction, the main frame is less likely to deform and therefore, less likely to absorb energy during a vehicular front collision. That is, this arrangement of the vehicle structures could result in an overall arrangement where the structural arrangement can not deform in a controlled manner in order to absorb energy from a collision. In contrast, where only one vehicle structure, such as a cross member alone, attaches to the main frame, this portion of the main frame may more readily compressively deform during a vehicular front collision.

Further, excessive impact force may disadvantageously be momentarily applied to the passenger in the cabin due to the joint between the main frame and the multiple vehicle structures. This is because the joint on the main frame which would be hard to compressively deform during vehicular front collision would cause the deceleration of the vehicle body rapidly increasing after the other part of the main frame (other than above joint between the main frame and the multiple vehicle structures) has already deformed.

The present disclosure is provided to address this issue. A purpose of the present disclosure is to absorb sufficient levels of energy during vehicular front collision (especially during a front full-lap collision) and to minimize energy absorption at the vehicle cabin area as much as possible.

SUMMARY

An energy absorbing structure for a vehicle is provided according to the embodiments disclosed herein. The energy absorbing structure includes: left and right main frames extending in a vehicle longitudinal direction respectively; a front cross member connecting between the pair of main frames; a rear cross member connecting between the pair of main frames; a pair of suspension towers attached to the pair of the main frames respectively, each of the suspension towers being provided between the front cross member and the rear cross member in the vehicle longitudinal direction; a pair of engine mount brackets attached to the pair of the main frames respectively, each of the engine mount brackets being provided between the front cross member and the rear cross member in the vehicle longitudinal direction; wherein each of the suspension towers is spaced out from a joint between the front cross member and the main frame and from a joint between the rear cross member and the main frame in the vehicle longitudinal direction, and each of the engine mount brackets is spaced out from the joint between the front cross member and the main frame, from the joint between the rear cross member and the main frame, and from a joint between the suspension tower and the main frame in the vehicle longitudinal direction.

According to the above configuration, the various vehicle structures, include but are not limited to a suspension tower, cross member, may be arranged in dispersed manner on the left and right main frames in the vehicle longitudinal direction (i.e. vehicle front and rear direction). Therefore, the main frame between the vehicle structures may deform in a controlled manner in the vehicle longitudinal direction. In contrast to an arrangement where the various vehicle structures are arranged to overlap one another in the vehicle longitudinal direction, the area(s) of a main frame may deform more readily where only one vehicle structure is attached to the main frame. By a stack of the aforementioned types of deformation, energy from a collision is absorbed, and impact force to the passenger cabin area may be minimized due to the energy absorption along the left and right main frames. Furthermore, it would be easy to control the level of impact force applied to the passenger cabin area because a plurality of portions of the main frame may securely deform during a vehicular front collision.

Preferably, in the frontal collision energy absorbing structure for the vehicle, each of the suspension towers may be bifurcated into a front leg and a rear leg at its lower part, with the legs being spaced out from each other in the vehicle longitudinal direction. A lower portion of the front leg and a lower portion of the rear leg may be separately attached to the main frame in the vehicle longitudinal direction.

According to this embodiment, the main frame may deform in a controlled manner given that the portion of the main frame between the front leg and the rear leg may also securely deform during a vehicular front collision. Therefore, the main frame may further absorb the impact energy through the deformation of the different areas of the front and rear legs of the suspension tower. Accordingly, due to the enhanced energy absorption in these areas, impact force applied to the passenger cabin area can be further reduced.

It is also to be understood that a depression may be formed on the main frame between the front leg and the rear leg of the suspension tower.

According to this embodiment, the portion of the main frame between the front leg and the rear leg may deform more readily and even more securely during a vehicular front collision. An engine mount bracket may also be provided between the suspension tower and the rear cross member in the vehicle longitudinal direction.

According to another embodiment, the various vehicle structures may be arranged in a dispersed manner on the front portion of the main frame while maintaining the arrangement of the engine and the front suspension at an appropriate position.

In an embodiment of the present disclosure, the frontal collision energy absorbing structure for the vehicle may include engine mount brackets wherein each engine mount brackets has an upper member and a lower member which are attached to an inner main frame side and which are extending substantially perpendicular to the inner main frame side. The upper member may be formed in an approximately reverse U shape in a cross section along the vehicle longitudinal direction. The lower member may be formed in an approximately U shape in the cross section along the vehicle longitudinal direction. The upper member and the lower member may attach to one another at the sides of each of the upper member and the lower member. An engine mount, which may be formed from a polymeric material, may be attached to an upper side of the upper member. A notch may also be formed on a bottom side of the lower member with the notch open inward in the vehicle wide direction, and a slot extending in the vehicle longitudinal direction is formed on inner main frame side and at a position overlapped with the each engine mount bracket in the vehicle longitudinal direction. It is to be understood that the notch formed on the lower member and the slot formed on the main frame facilitate the energy absorption and deformation of these vehicle structures.

According to this embodiment, the lower member of the engine mount bracket may deform during a vehicular front collision. Furthermore, the joint between the engine mount bracket and the main frame is operatively configured to compressively deform during a vehicular front collision, due to the deformation of the lower member and the slit of the main frame. Accordingly, the deformation of the main frame may be further optimized for enhanced energy absorption in a vehicular front collision.

As described above, according to the present disclosure, adequate energy absorption in the main frame may be obtained, because the vehicle structures which would otherwise inhibit the deformation of the main frame would be arranged in a dispersed manner on the main frame in the vehicle longitudinal direction. Further, the impact force applied to the passenger cabin area may be restricted due to the enhanced energy absorption in the main frame. Accordingly, this advantageously results in further reducing the impact force applied to the passenger cabin area.

DETAILED DESCRIPTION

This present disclosure is made so as to address this issue. The present disclosure provides a vehicle structure which can absorb energy and provide controlled deformation in a front collision to improve vehicle safety.

Hereafter, the embodiment of the present disclosure is explained in detail based on drawings.

Figure 1:
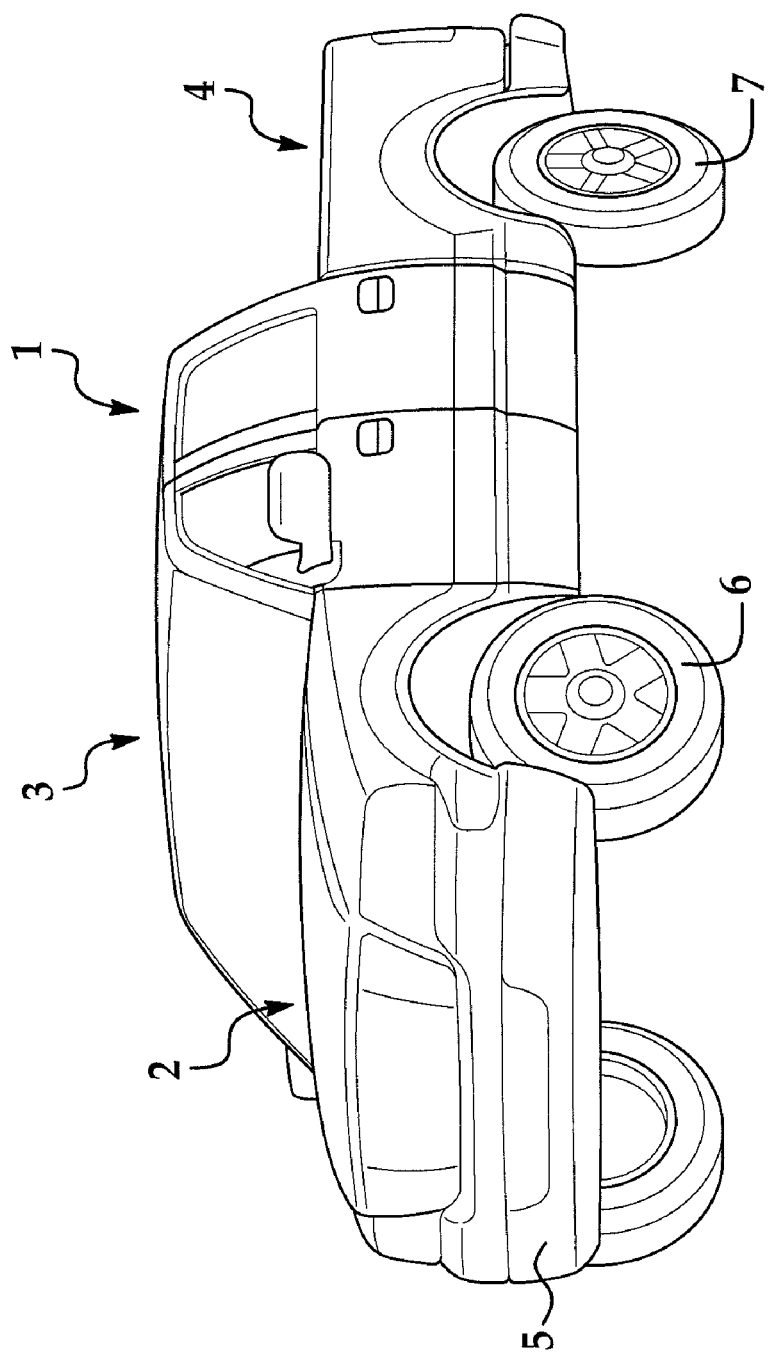
FIG. 1 is a perspective view showing the entire vehicle with frontal collision energy absorbing structure according to the embodiment of the present disclosure.
Figure 2:
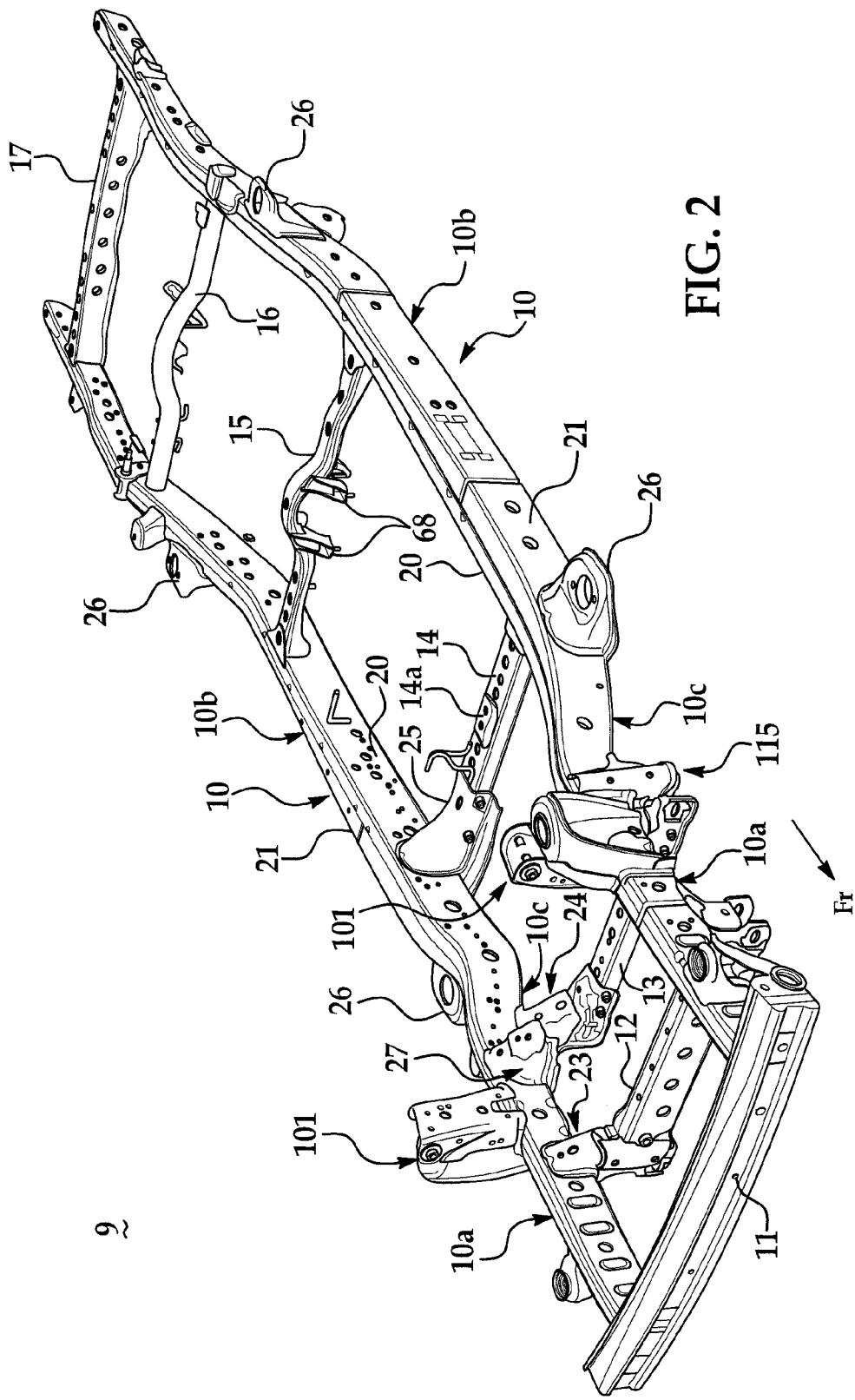
FIG. 2 is a perspective view seen from upper, front and left side of the vehicle and showing the entire chassis frame of the vehicle.
Figure 14:
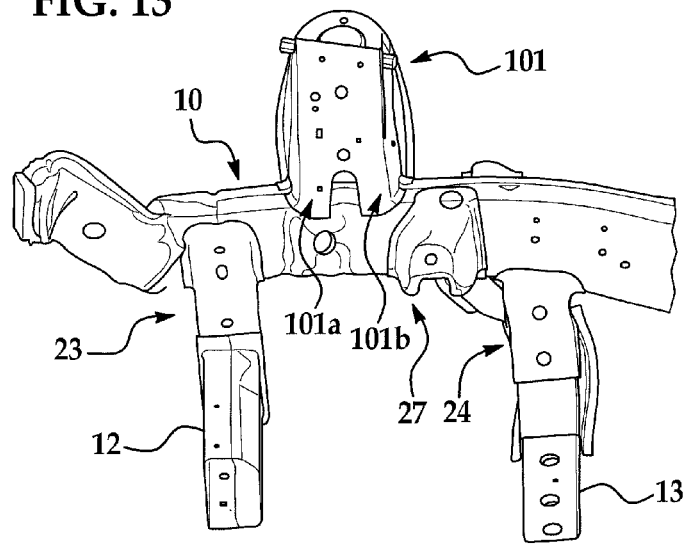
FIG. 14 is a deforming simulation result of the right main frame of the chassis frame during early stage of vehicular front collision, which showing the state of the deformation of the main frame when seen from inner side in the vehicle wide direction.
Figure 15:
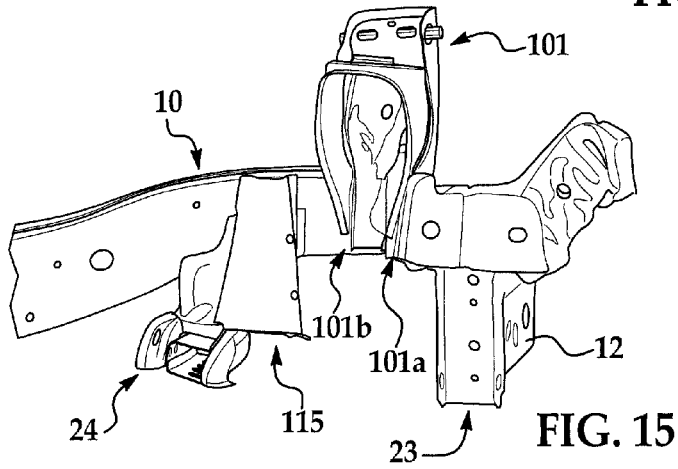
FIG. 15 is a deforming simulation result of the right main frame of the chassis frame during late stage of vehicular front collision, which showing the state of the deformation of the main frame when seen from outer side in the vehicle wide direction.

FIG. 1 shows the whole of vehicle 1 (in this embodiment, light truck) having the vehicle structure according to an embodiment of this present disclosure. In addition, FIGS. 2 to 9 show the whole or a part of chassis frame 9 of vehicle 1, and FIGS. 14 to 15 show a state of deformation in chassis frame 9.

Figure 9:
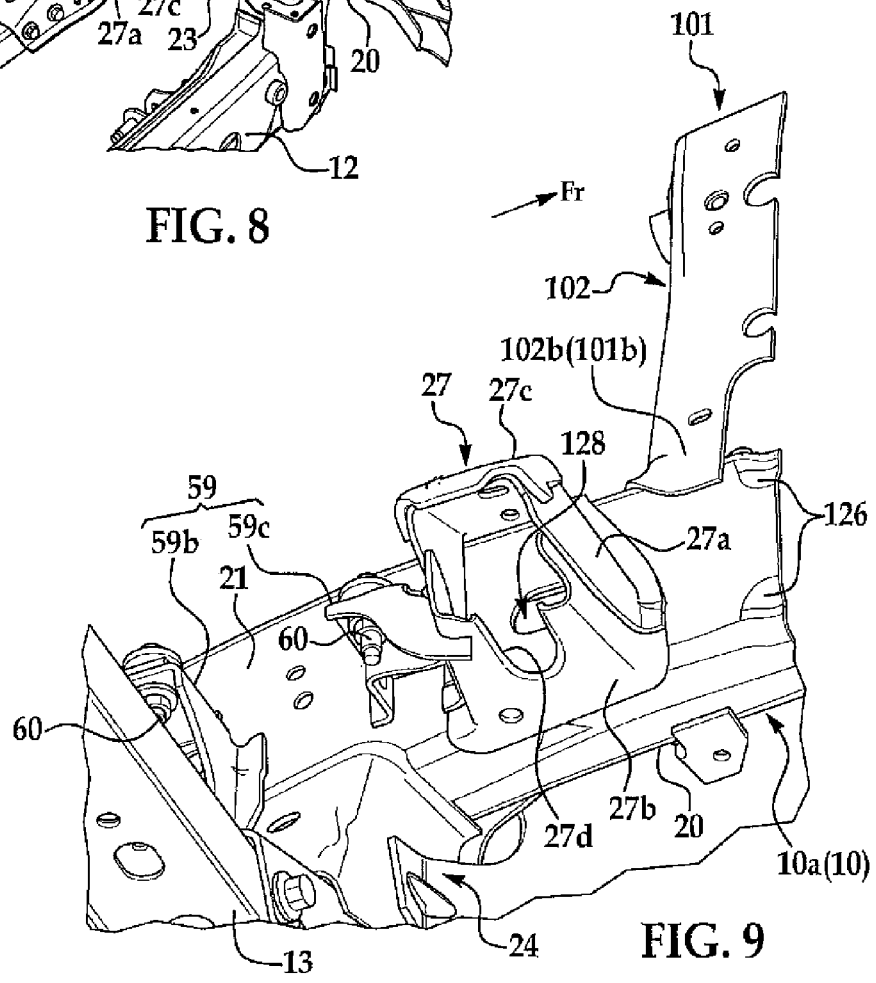
FIG. 9 is a perspective view seen from inner side in the vehicle wide direction and showing around an engine mount bracket and a left main frame of the chassis frame.
Figure 10:
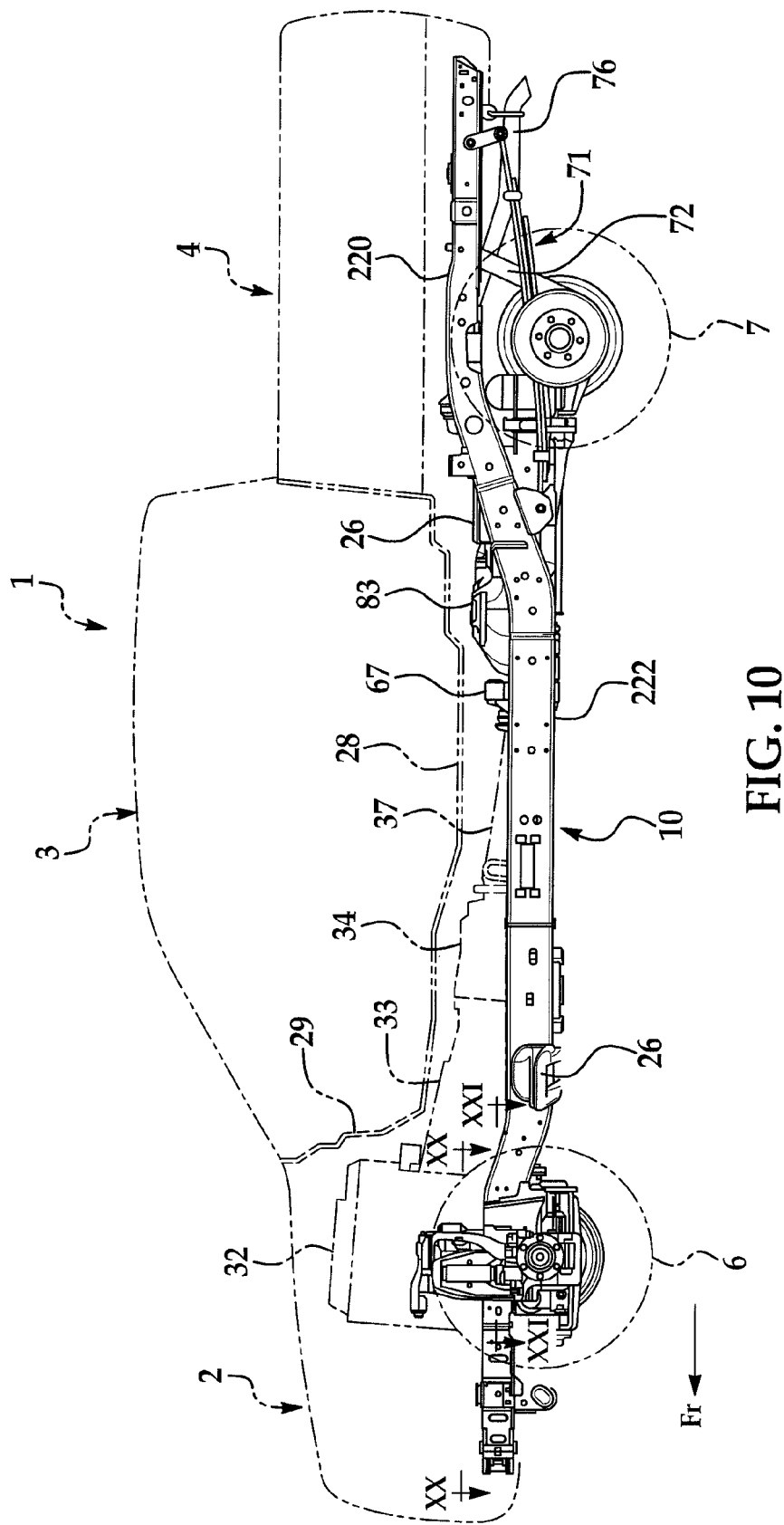
FIG. 10 is a side view seen from left side of the vehicle and showing a chassis frame equipped with various components (including units).

As shown in FIGS. 1 and 10, vehicles 1 are equipped with an engine compartment 2, a cabin 3, and a rear deck 4 sequentially from a front side. Hereafter, in the front, the back, the left, and the right about vehicles 1 are just called a front, back, left and right, respectively. Moreover, in FIGS. 2 to 11, the front side of vehicles 1 is indicated to be Fr.

Vehicle 1 has a chassis frame 9 at the lower side. This chassis frame 9 is composed of a pair of right and left main frames 10 (also called side frames) extending in the vehicle longitudinal (front and back) direction and a plurality of (in this embodiment, 7) cross members (Hereafter, it is sequentially called the first-seventh cross member 11-17 ahead) extending in the vehicle wide direction and connecting between these main frames 10, and forms the ladder shape in its top view. Each main frame 10 is formed in an approximately rectangular shape in a cross section with the inner main frame panel 20 arranged on the inner side of each main frame 10 and outer main frame panel 21 arranged on the outer side of each main frame, and a close section space is formed between these both panels 20 and 21.

The first cross member 11 is attached to front end 200 of the both main frames 10 and functions as a bumper reinforcement for reinforcing the front bumper 5 (see FIG. 1). The second cross member 12 is attached to the left and right main frames 10 at its both ends through a second cross member bracket 23 welded to the left and right main frames 10 respectively. Also, the third cross member 13 is attached to the left and right main frames 10 through a third cross member bracket 24 welded to the left and right main frames 10 respectively. The second cross member bracket 23 can be considered to be a part of the second cross member 12, and the third cross member bracket 24 can be considered to be a part of the third cross member 13. The fourth cross member 15 is attached to the left and right main frames 10 at its both ends through a large gusset 25 welded to the left and right main frames 10 respectively. This gusset 25 operates as both a bracket and a role of reinforcement. The gusset 25 is considered to be a part of the fourth cross member 14. Both ends of fifth cross member 15, sixth cross member 16 and seventh cross member 17 are attached directly to the left and right main frames 10 respectively.

Figure 3:
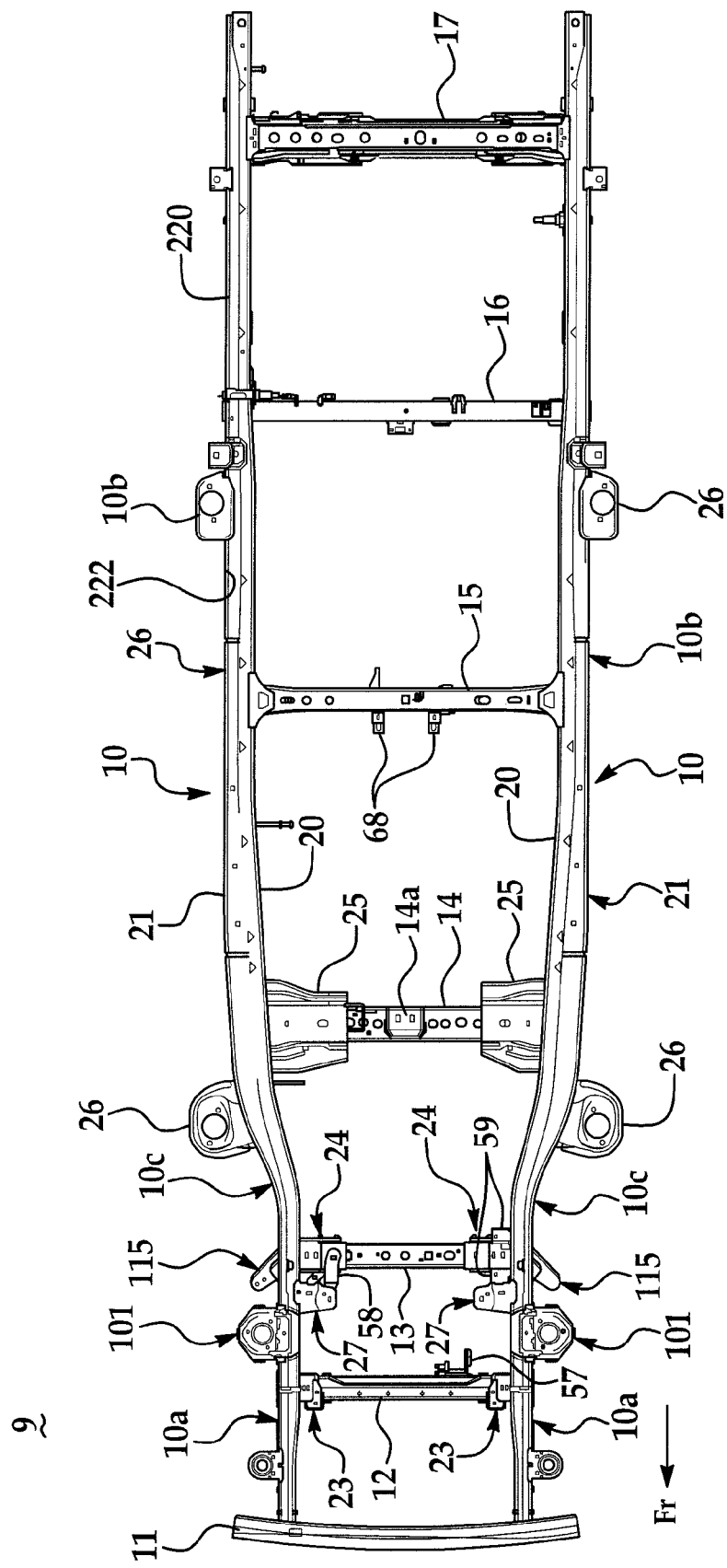
FIG. 3 is a top view showing the chassis frame.

Each main frame 10 has a small width section 10a (shown in FIG. 2a) positioned on the both sides (in the vehicle wide direction) of lower area in the engine compartment 2, a large width section 10b positioned under the cabin 3 and the rear deck 4, and a width expanding section 10c positioned between the small width section 10a and the large width section 10b (i.e. at a rear end of the engine compartment 2). See FIG. 10 about positional relationship between the small width section 10a, the width expanding section 10c, the large width section 10b, the engine compartment 2, the cabin 3 and the rear deck 4. The spacing between the main frames 10 at the large width section 10b is larger than that between the both main frames 10 at the small width section 10a. The spacing between the both main frames 10 at the width expanding section 10c becomes larger as they come rearward. A cross section (or width) of the each large width section 10b itself is larger than that of each small width section 10a itself. Each width expanding section 10c extends outward (in a vehicle transverse direction) as it extends from the small width section 10a to the large width section 10b. A cross section (or width) of the width expanding section 10c increases as the width expanding section 10c extends to the large width section 10b. Thus, a pair of the width expanding sections 10c, the third cross member 13 and the fourth cross member 14 form the trapezoidal shape in their top view as shown in FIG. 3.

A cross section (or width) of the large width section 10b itself is largest at or near the joint between the fourth cross member 14 and the large width section 10b. The cross section (or width) of the large width section 10b itself becomes smaller gradually as the large width section extends rearward from the fourth cross member 14 to the sixth cross member 16 as shown in FIG. 3. The cross section (or width) of the large width section 10b located rearward of the sixth cross member 16 is substantially constant. Thus, the fourth cross member 14 is connected to the large width section 10b where its cross section (or width) is the largest, and the joint for connecting the fourth cross member 14 to the large width section 10b may be reinforced by a large gusset 25.

A part of the large width section 10b of each main frame 10 (positioned under the cabin 3) is positioned at the height below the small width section 10a. The width expanding section 10c downwardly declines as it extends in the rearward direction. As shown in FIGS. 3 and 10, the back portion 220 of the large width section 10b of each main frame 10 (positioned under the rear deck 4 and rearward of the sixth cross member 16) is disposed higher than the center portion 222 of each main frame. Accordingly, the rear part of the large width section 10b (positioned under the cabin 3) is upwardly inclined as it extends in a rearward direction as shown in FIG. 10.

Cab mount brackets 26 are attached respectively to the width expanding section 10b of the each main frame 10 near the front side of the fourth cross member 14 and near the large width section 10b near the front side of the sixth cross member 16. A vehicular body component constituting the cabin 3 (shown in FIG. 1) is mounted on the cab mount bracket 26 through a cab mount having a rubber mounting member (not shown). The cab mount bracket 26 may be attached by welding the cab mount bracket 26 to the main frame 10 on its outer side 21 and its lower side.

In addition, a vehicular body member constituting a floor 28 of the cabin 3 (among body members constituting cabin 3) may be a floor panel 28, and the body member partitioning off the engine compartment 2 and the cabin 3 is a dash panel 29. A lower end of the dash panel may be connected to a front end of the floor panel. The rear end of the floor panel 28 may bend upwardly and partition off the cabin 3 and the rear deck 4.

Figure 11:
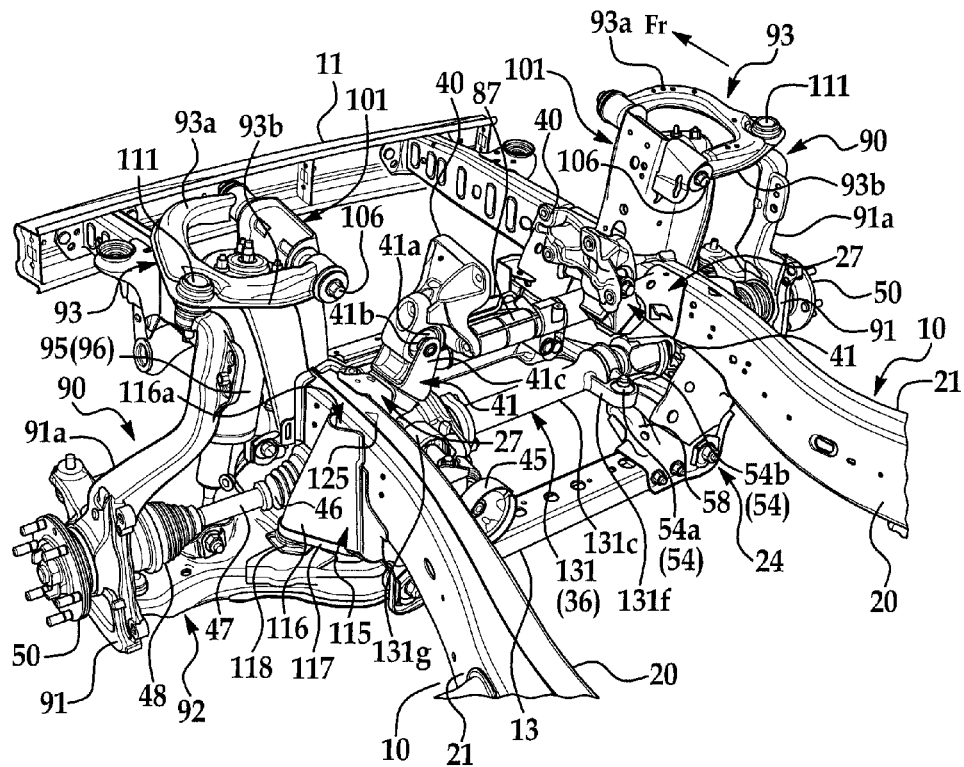
FIG. 11 is a perspective view seen from upper, rear and left side of the vehicle and showing a front portion of the chassis frame equipped with the various components.
Figure 17:
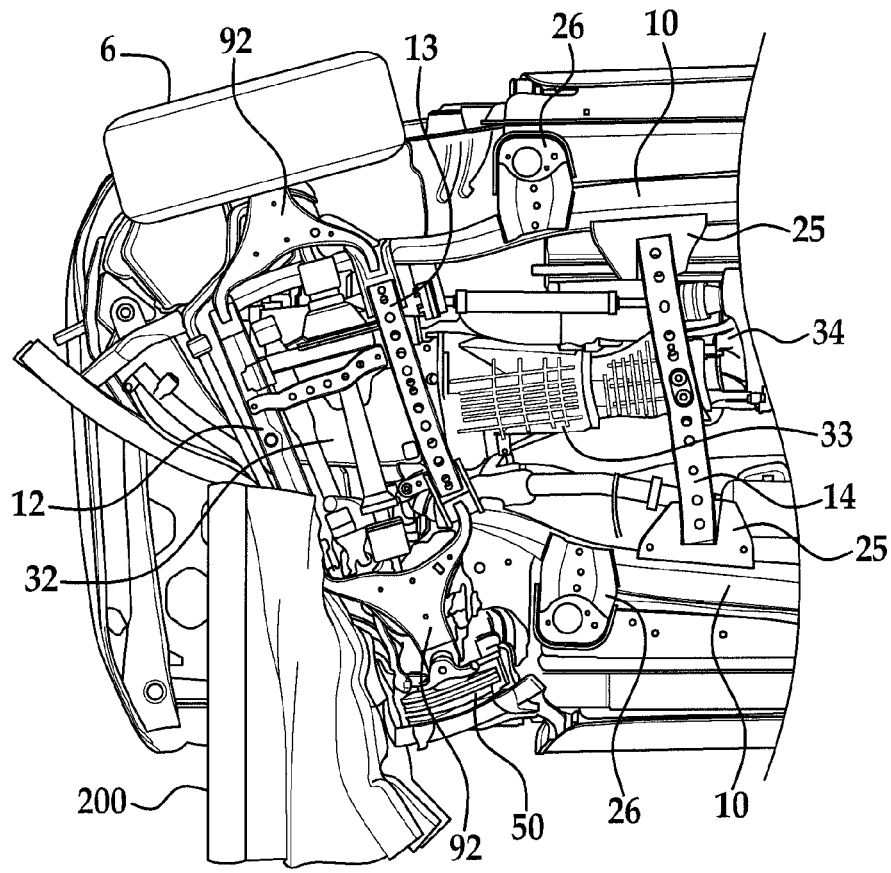
FIG. 17 illustrates the underside of the present disclosure with the engine shown in place.

Engine 32 may be a transverse-mounted engine having plural of cylinders (e.g. five cylinder in this embodiment) arranged in a row along the vehicle's longitudinal axis or direction. A transmission unit is connected to the rear side of the engine 32. As shown in FIG. 11, brackets 40 extending in right direction and left direction respectively are attached on both right and left sides of the engine 32 (shown in FIG. 17). Engine mount 41 may also provided wherein engine mount 41 has a central axis 41b penetrating the center portion of the rubber bushing 41a along the vehicle's longitudinal axis or direction and a supporting member 41c supporting both ends of the central axis 41b. The supporting member 41c may also be attached to the engine mount bracket 27. Accordingly, the engine 32 (shown in FIG. 17) is elastically supported on the engine mount bracket 27 through the bracket 40 and the engine mount 41.

Figure 7:
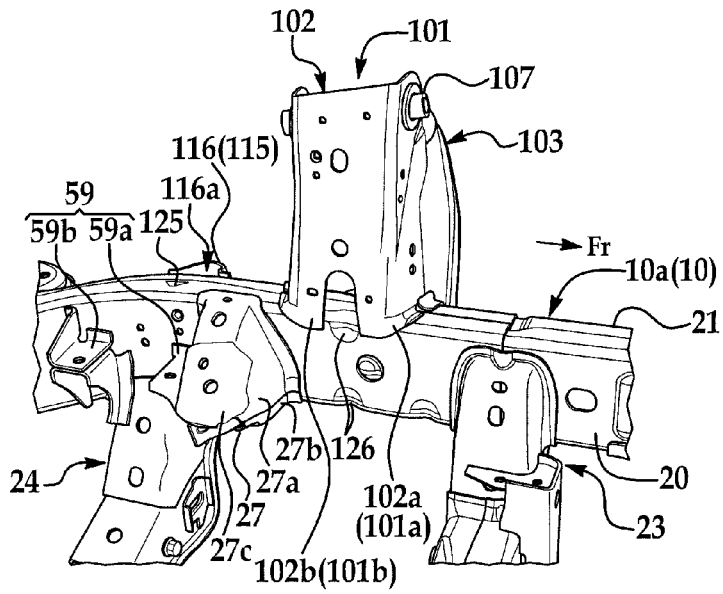
FIG. 7 is a perspective view seen from inner side in the vehicle wide direction and showing around a suspension tower and a left main frame of the chassis frame.
Figure 8:
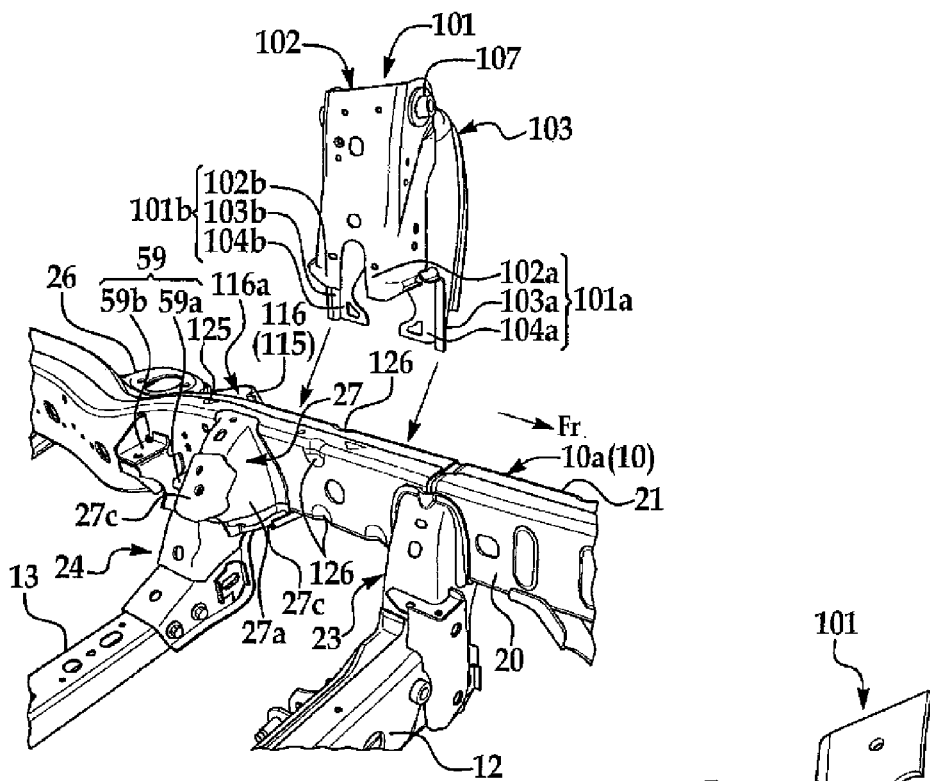
FIG. 8 is an exploded perspective view seen from inner side in the vehicle wide direction and showing around a suspension tower and a left main frame of the chassis frame.

As shown in FIGS. 7 to 9, each engine mount bracket 27 has an upper member 27a and a lower member 27b which are welded on an inner main frame panel 20 of the each main frame 10. The engine mount bracket 27 may be substantially perpendicular on the inner main frame panel 20 as shown in FIG. 7. The upper member 27a is formed in an approximately reverse U shape in a cross section along the vehicle longitudinal direction. The lower member 27b is formed in an approximately U shape in the cross section along the vehicle longitudinal direction. Both side ends of the upper member 27a and both side ends of the lower member 27b are coupled to one another. A cavity is formed between both members 27a, 27b as shown in FIG. 9.

Figure 18:
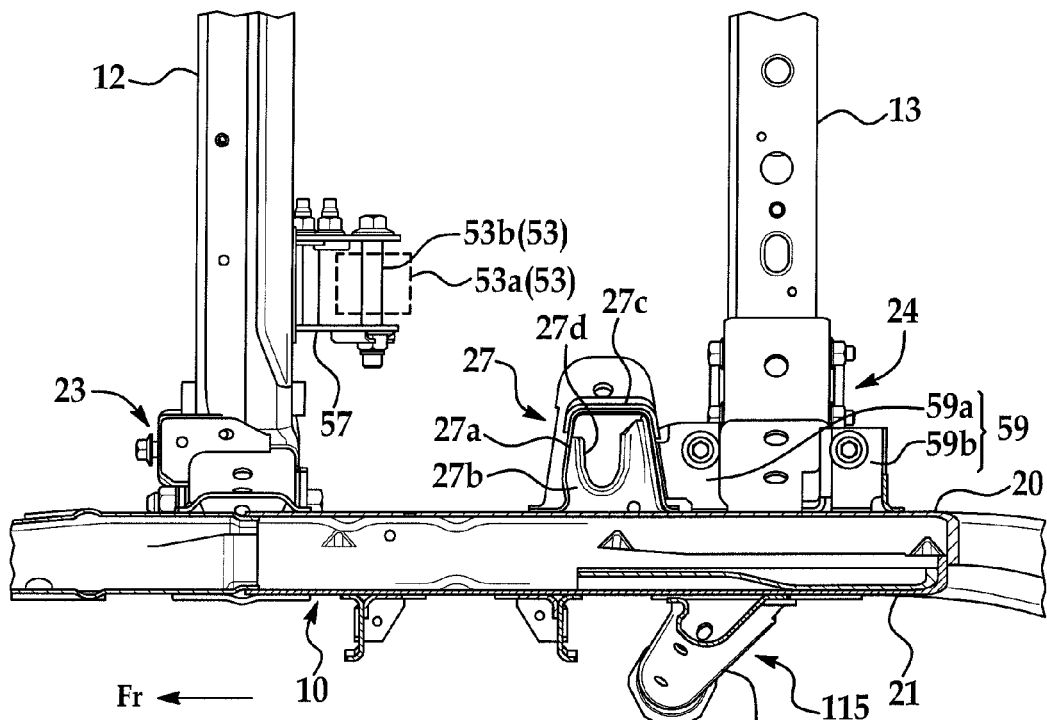
FIG. 18 illustrates the underside of the present disclosure with the reinforcements illustrated relative to the main frame.

Referring now to FIGS. 8, 9 and 11, the supporting member 41c of the engine mount 41 is attached to an upper side of the upper member 27a through a reinforcement member 27c (shown in FIG. 18). Further, a notch 27d (shown in FIG. 9, or apertures, a thin-walled portion, a step portion, etc., not shown) may be defined on the bottom side (i.e. a portion extending horizontally) of the lower member 27b. The notch 27d may open inward in a direction that is substantially perpendicular to the main frames 10, and is formed in an approximately U shape in a top view. (See FIG. 9) This notch 27d is formed so that engine mount bracket 27 may absorb energy and may be deformed along the vehicle's longitudinal axis or direction during vehicular front collision as much as possible. Further, a slot 128 (or depression, a thin-walled portion, a step portion, etc., not shown) extending along the vehicle's longitudinal axis (or direction) is defined on the inner main frame panel 20 of the each main frame 10 as shown (in FIG. 9) and at a position which overlaps with the each engine mount bracket 27 along the vehicle's longitudinal axis (or direction) (i.e. a position corresponding to the above space). (See FIG. 9)

The slot 128 defined in the inner main frame panel 20 allows the engine mount bracket 27 and the joint between the engine mount bracket 27 and the main frame 10 to deform in a controlled manner along the vehicle's longitudinal axis (or direction) during a front collision.

Referring now to FIGS. 1 and 11, right and left front wheels 6 are supported by right and left front wheel suspension devices 90. Each of the front wheel suspension devices 90 is a high mount type double wishbone type suspension, and has a knuckle 91, a lower arm 92, an upper arm 93, a coil spring, and a shock absorber 95. The stabilizer (not shown) of the front wheel suspension device 90 has been omitted from FIG. 11.

The lower arm 92 is configured such that the lower arm 92 may be bifurcated into a front end 92a and a rear end 92b (as shown in FIG. 11). The front end 92a of the lower arm 92 is attached to the second cross member 12 through a cross member bracket 23. A rear end 92b of the lower arm 92 is attached to the third cross member 13 through a third cross member bracket 24. Specifically, the front end 92a is rotatably attached to a lower arm pivot axis 98 (see FIG. 6) which is formed in the second cross member bracket 23 and which extends along the vehicle's longitudinal axis (or direction). The rear end 92b is also rotatably attached to a lower arm pivot axis 99 (see FIG. 6) which is formed in the third cross member bracket 24 and which extends along the vehicle's longitudinal axis (or direction). Thus, the lower arm 92 can swing upward and downward on the lower arm pivot axis 98,99.

The upper arm 93 may also be configured so that the upper arm 93 may be bifurcated into a front end 93a and a rear end 93b. A front end 93a and a rear end 93b of the upper arm 93 are rotatably attached respectively to both ends of a upper arm pivot axis 106 (see FIG. 11) which is formed in the inner tower panel 102 of a suspension tower 101 (which is described below) and which may extend along the vehicle's longitudinal axis (or direction). Thus, the upper arm 93 may move or swing upward and downward on the upper arm pivot axis 106.

The lower arm 92 may extend substantially perpendicular to and outward from the main frame 10 from the front end 92a and the rear end 92b. At its knuckle 91, the lower arm 92 is connected to the lower end of the knuckle 91 through a ball joint (shown as 111 in FIG. 11). The upper arm 93 may extend substantially perpendicular to and outward from the main frame 10 from the front end 93a and the rear end 93b. The upper arm 93 may be connected to an arm 91a extending upward of the knuckle 91 through a ball joint 111 (see FIG. 11). Thus, the knuckle 91, the lower arm 92 and the upper arm may swing or move upward and downward as the front wheel or tires 6,7 moves upward and downward.

Referring again to FIG. 11, the suspension towers 101 may be attached respectively to the small width sections 10a of each main frame 10 between the second cross member 12 and the third cross member 13. Each of the suspension tower 101 supports the top portion of the strut 96 (i.e. the coil spring and shock absorber) which extends vertically.

Figure 19:
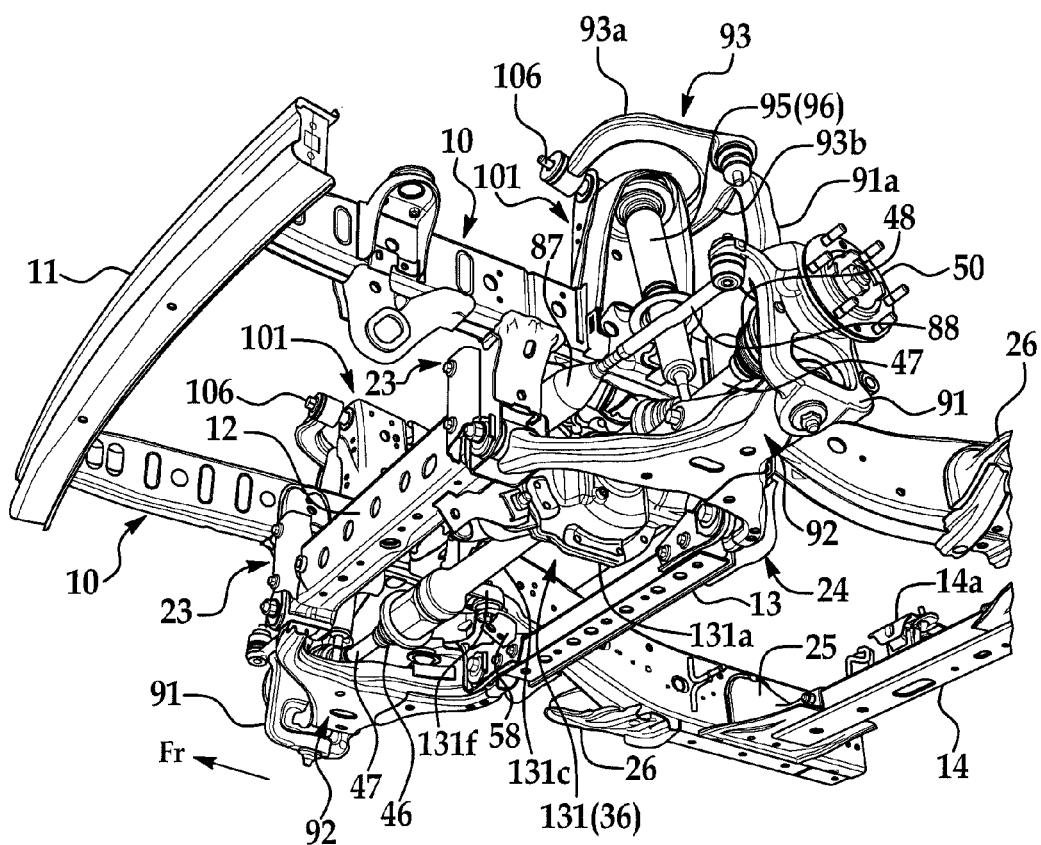
FIG. 19 illustrates a partial, perspective view of the present disclosure with the strut shown in the suspension tower.

Further, the lower end of the strut 96 (shown in FIGS. 11 and 19) (i.e. a lower end of the shock absorber) may be rotatably connected to the lower arm 92 as shown in FIG. 19. The lower end of the strut 96 may rotate about an axis extending along the vehicle's longitudinal direction or axis.

Referring to FIG. 8, each suspension tower 101 has an inner tower panel 102, an outer tower panel 103 located outward of the inner tower panel 102 and attached to the inner tower panel 102, and a suspension tower reinforcement 104 provided between the inner tower panel 102 and the outer tower panel 103. And a front leg 101a and a rear leg 101b are provided in the lower portion of the each suspension tower 101. Each of the suspension towers 101 may be bifurcated into a front leg 101a and a rear leg 101b at its lower part, wherein the front leg 101a and the rear leg 101b are spaced apart from each other along the vehicle's longitudinal axis or direction.

Figure 6:
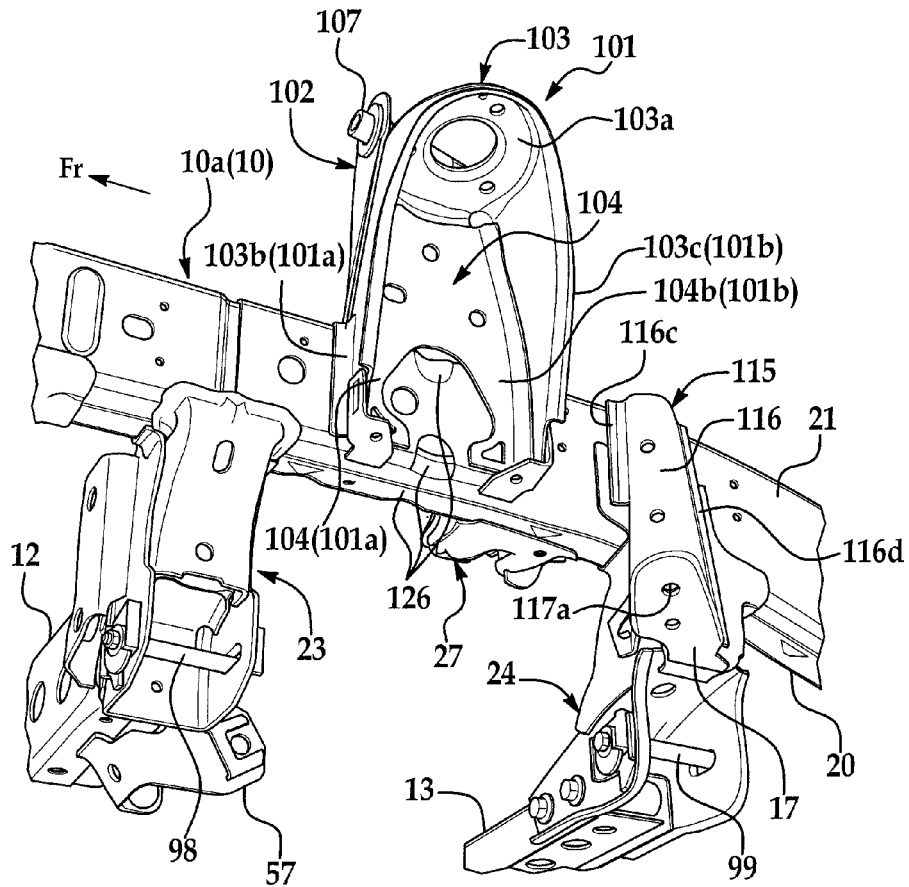
FIG. 6 is a perspective view seen from outer side in the vehicle wide direction and showing around a suspension tower and a left main frame of the chassis frame.

Referring now to FIG. 6, the upper portion of outer tower panel 103 has a strut support 103a for supporting a top of strut 96 (shown in FIG. 11), and a top of the coil spring (not shown) and the shock absorber (not shown) is fixed and supported to this strut support 103a. The outer tower panel 103 has an outer panel front leg 103b and an outer panel rear leg 103c extending downward respectively from a front edge and a rear edge of the upper end of the outer panel 103.

With reference to FIG. 6, the above suspension tower reinforcement 104 is welded to the outer tower panel 103 to cover the opening defined on the inner side (in the vehicle wide direction) of the outer tower panel 103 between the outer panel front leg 103b and the outer panel rear leg 103c. The strut 96 (shown in FIG. 11) is contained in the cavity which is defined by the outer panel front leg 103b, the outer panel rear leg 103c, and the suspension tower reinforcement 104 and which is open outward in the vehicle wide direction. In yet another embodiment, the suspension tower reinforcement 104 may be formed integrally with the outer panel 103, without providing a suspension tower reinforcement 104.

The outer tower panel 103 may be welded to the inner tower panel 102. As shown, the suspension tower reinforcement 104 may also be welded to the outer tower panel 103. Under this welded condition, closed cross sectional space is formed between the inner tower panel 102 and the suspension tower reinforcement 104. In the embodiment where, the suspension tower reinforcement 104 is formed integrally with the outer panel 103, a closed cavity is formed between the inner tower panel 102 and the outer panel 103.

Figure 4:
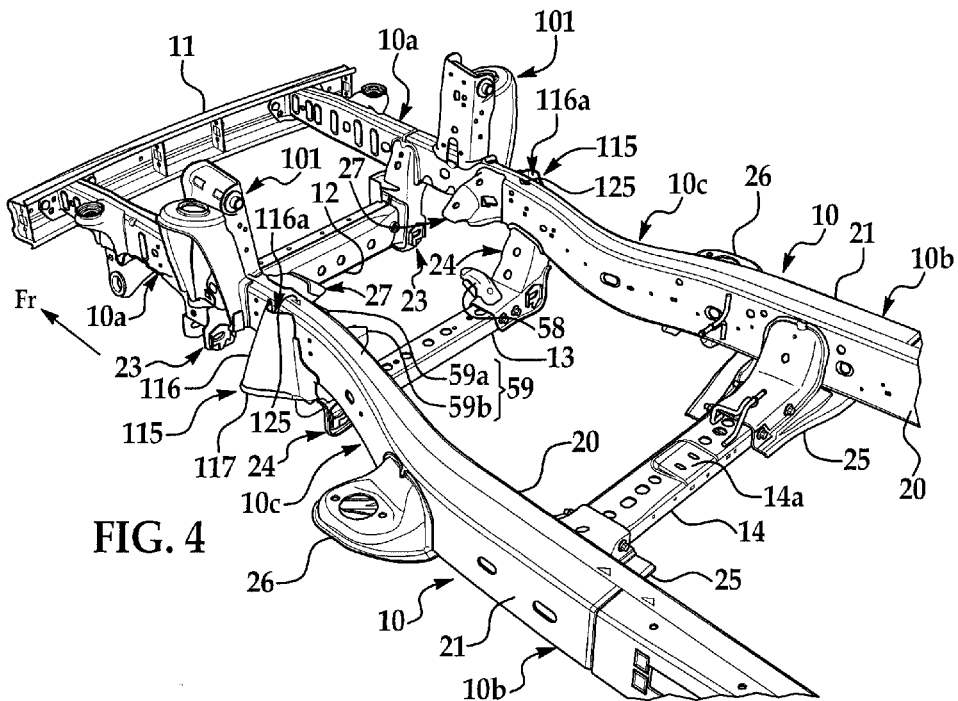
FIG. 4 is a perspective view seen from upper, rear and left side of the vehicle and showing a front portion of the chassis frame.
Figure 5:
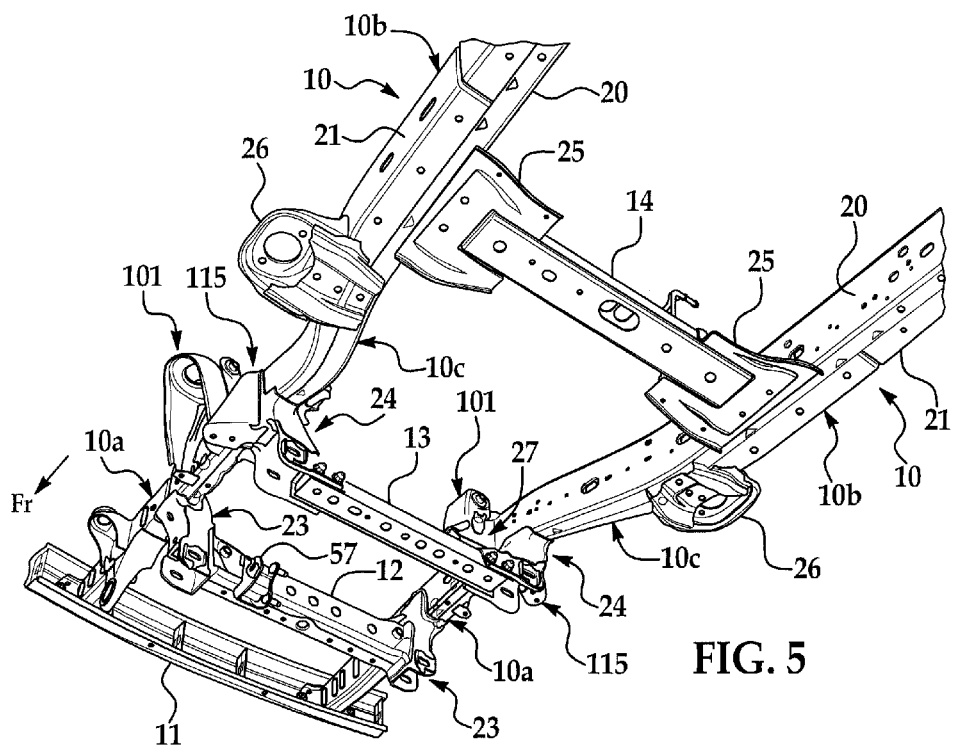
FIG. 5 is a perspective view seen from under, rear and left side of the vehicle and showing a front portion of the chassis frame.

Furthermore, as shown in FIGS. 4 and 6, the inner tower panel 102 projects upward more than the outer panel 103, and the outer tower panel 103 projects downward more than the inner tower panel 102. The upper arm pivot axis 106 which supports the upper arm 93 is provided at above upward projection of the inner tower panel 102 so that the upper arm pivot axis 106 extends along the vehicle's longitudinal axis or direction. It is to be understood that the terms vehicle's longitudinal axis and vehicle's longitudinal direction may be used interchangeably. This upper arm pivot axis 106 is inserted through a support sleeve 107 provided in the inner tower panel 102. A stiffener 207 is provided on the outer side of the support sleeve 107 in the vehicle wide direction (i.e. upper portion of the outer panel 103). Thus, a portion of the inner tower panel 102 where the upper arm pivot axis 106 is provided is reinforced by this stiffener 207. The reason why the upper arm pivot axis 106 is provided in the inner tower panel 102 is because it is possible to lengthen arm length of the upper arm 103 compared to providing the upper arm pivot axis 106 is provided in the outer panel 103.

The inner tower panel 102 is bifurcated into an inner panel front leg 102a and an inner panel rear leg 102b at its lower part, wherein the inner panel front leg 102a and the inner panel rear leg 102b are spaced out from each other along the vehicle's longitudinal axis (or direction). The suspension tower reinforcement 104 is bifurcated into a reinforcement front leg 104a and a reinforcement rear leg 104b at its lower part, wherein the reinforcement front leg 104a and the reinforcement rear leg 104b are spaced out from each other along the vehicle's longitudinal axis (or direction).

The inner panel front leg 102a, the outer panel front leg 103b, and reinforcement front leg 104a constitute the front leg 101a of the suspension tower 101, and the inner panel rear leg 102b, the outer panel rear leg 103c, and reinforcement rear leg 104b constitute the rear leg 101b of the suspension tower 101.

The front leg 101a and the rear leg 101b of the each suspension tower 101 are each separately (along the vehicle's longitudinal axis or vehicle's longitudinal direction) attached to the main frame 10 via a welding process or the like. Specifically, the inner panel front leg 102a and the inner panel rear leg 102b of each inner tower panel 102 are separated from each other (along the vehicle's longitudinal axis or the vehicle's longitudinal direction). The inner tower panel 102 is attached to the main frame 10 at the inner main frame panel 20 at an upper surface of the inner main frame panel 20. Further, the outer panel front leg 103b and the outer panel rear leg 103c of each outer tower panel 103 are separated from each other (along the vehicle's longitudinal direction). The outer tower panel 103 may be attached to an outer main frame panel at an upper surface of the outer main frame panel 21.

Furthermore, the reinforcement front leg 104a and the reinforcement rear leg 104b of the each suspension tower reinforcement 104 also separate from each other (along the vehicle's longitudinal direction). The reinforcement rear leg 104b and the reinforcement front leg 104a are attached to the outer main frame panel 21 via a welding process or the like. Therefore, the lower end of the suspension tower 101 is not continuously attached on the main frame 10 along the vehicle's longitudinal direction. The lower end of the suspension tower 101 has a portion which is not attached to the main frame 10 between the reinforcement front leg 104a and the reinforcement rear leg 104b. Thus, provided that the lower end of the suspension tower 101 is attached to the main frame through the front leg 101a and the rear leg 101b, the suspension tower 101 is attached to the main frame 10 through the inner panel front leg 102a and the inner panel rear leg 102b at an inner side of the suspension tower 101 (in the vehicle wide direction), and is attached to the main frame 10 through the outer panel front leg 103b, the outer panel rear leg 103c, the reinforcement front leg 104a and the reinforcement rear leg 104b at an outer side of the suspension tower 101 (in the vehicle wide direction). Thus, attaching strength for attaching the suspension tower 101 to the main frame may bear the force received from the strut 96.

Plural depressions (e.g. four depressions) 126 (see FIGS. 6 to 9) are formed on the each main frame 10 between the front leg 101a and the rear leg 101b (e.g. four place in total such as two edges between an upper surface and both side surfaces of the main frame 10 and two edges between an lower surface and both side surfaces of the main frame 10). Due to these plural depressions, portions in each main frame 10 where the depressions 126 are formed allow for ready compressive deformation along the vehicle's longitudinal direction during a vehicle front collision to provide controlled deformation and energy absorption. In traditional designs, the joint between the main frame 10 and the suspension tower 101 is less capable of absorbing energy via deformation. However, by separately attaching the front leg 101a and the rear leg 101b (which are spaced apart from each other along the vehicle's longitudinal direction) to the main frame 10, the portion in the main frame 10 between the front leg 101a and the rear leg 101b is more able to absorb energy and deform along the vehicle's longitudinal direction during vehicle front collision. Furthermore, by defining fragile areas such as depressions 126 (or apertures, a thin-walled portion, a step portion, etc., not shown) on the portion of the main frame 10 between the front leg 101a and the rear leg 101b, this area of the main frame 10 is better able to deform in the desired manner and absorb energy. The depressions 126 may also be defined on the main frame 10 anywhere between the front leg 101a and the rear leg 101b. A depression 126 may be formed in one area on the main frame or depressions may be formed in multiple areas on the main frame.

The second cross member 12 which corresponds to a front cross member in the claims, is provided frontward of the suspension tower 101, and is spaced apart from the suspension tower 101 as shown in FIG. 8. Furthermore, the third cross member 13, which corresponds to a rear cross member in the claims is provided rearward of the suspension tower 101, and is also spaced apart from the suspension tower 101.

Each engine mount bracket 27 is spaced apart from the suspension tower 101, the second cross member 12 (and the cross member bracket 23), the third cross member 13 (and the third cross member bracket 24) which are all affixed or coupled to the inner main frame panel 20. The engine mount bracket 27 is also spaced apart along the vehicle's longitudinal direction from a joint between the suspension tower 101 and the main frame 10, a joint between the second cross member 12 (i.e. the cross member bracket 23) and the main frame 10, and a joint between the third cross member 13 (i.e. third cross member bracket 24) and the main frame 10. The second and third cross members 12, 13 are coupled to the inner main frame panel 20 via a welding process or the like.

For example, as shown in FIG. 9, the front edge 27a of engine mount bracket 27 is diagonally inclined downward. The engine mount bracket 27 is spaced apart along the vehicle's main frame from the rear leg 101b of the suspension tower 101. That is, there is a predetermined gap between the front edge 27a of the engine mount bracket 27 and the rear leg 101b. Therefore, due to this gap, the main frame can absorb energy and deform in a controlled manner as identified below.

In this embodiment, each engine mount bracket 27 is provided on each main frame 10 between the suspension tower 101 and the third cross member 13. Therefore, the rearward movement of the engine 32 in a vehicular front collision can be delayed, because the engine 32 may be located comparatively rearward in a front part of the main frame 10. As a result, it is possible to increase energy absorption at the front portion of the main frame 10 before the engine starts to move rearward during a front collision.

In addition, each engine mount bracket 27 may be coupled or affixed to each main frame 10 between the suspension tower 101 and the second cross member 12. Also in this case, each engine mount bracket 27 is spaced apart along the main frame from the suspension tower 101 as well as the second cross member 12 and the third cross member 13. Accordingly, the engine 32 may move rearward in a front collision given that the engine tends to be disposed comparatively frontward in a front part of the main frame 10. As a result, energy is absorbed by the deformation of the main frame 10. Therefore, the vehicle structure of the present disclosure takes into account the rearward movement of the engine 32 and allows the engine mounting arrangement to further improve energy absorption and control deformation.

Figure 12:
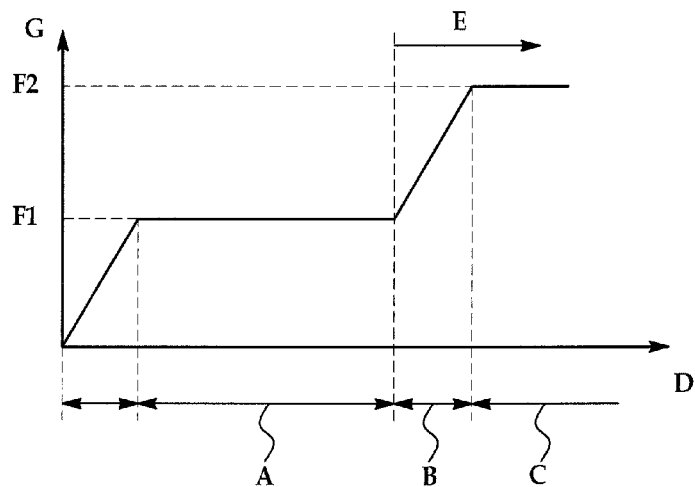
FIG. 12 is a graph showing the relationship between collapse stroke of the vehicle (i.e. intrusion distance of the barrier into the vehicle) and impact force G applied to the passenger in the cabin during vehicular front collision.

During vehicle front full-lap collision, as shown in FIG. 12, the portion of the main frame frontward of the engine begins to deform in the area designated as "A". The portion of the main frame between the engine front end and the dash panel deforms in the area designated as "B." The engine then begins to move in a rearward direction in the area designated as "E" in FIG. 12. The dash panel then deforms in the rearward direction as shown in the area designated as "C" in FIG. 12. In the area designated as "D" in FIG. 12, the main frame is fully deformed. A rearward impact force would be applied to the front bumper 5 and the first cross member 11. Hereby, impact force G applied to the cabin 3 may be increased up to F1, as shown in FIG. 12.

Then, portions of both right and left main frames 10 between the first cross member 11 and the second cross member 12 would be compressively deformed along the longitudinal direction of the main frame 10. At this time, the impact force is F1.

Next, in both main frames 10, portions between: (1) the second cross member 12 and the suspension tower 101; (2) the front leg 101a and the rear leg 101b of the suspension tower 101 (i.e. portions where the depressions 126 are formed); (3) the suspension tower 101 and the engine mount bracket 27; and (4) the engine mount bracket 27 and the third cross member 13 (including portions where a bump stopper 115 is provided) are deformed in a controlled manner along the vehicle's longitudinal direction. Furthermore, while deforming the aforementioned portions, the engine moves rearward. After awhile, the dash panel (not shown) is deformed rearward (i.e. moves rearward while being deformed) by the engine 32 as the engine 32 is moving rearward. As the engine 32 starts to move rearward, the impact force G would start to be increased to become F2 when the dash panel 29 starts to be deformed rearward due to rearward movement of the engine 32.

Here, the value of F2 varies according to the deformation of both main frames 10. The F2 could be reduced by increasing the areas of the vehicle structure which could deform and absorb energy. However, multiple vehicle structures which inhibit the main frame 10 from compressively deforming along the vehicle's longitudinal direction during vehicular front collision may be attached to the both main frames 10 between the second cross member 12 and the third cross member 13. For example, the vehicle structures might be the second cross member 12, the third cross member 13, the suspension tower 101 and/or the engine mount bracket 27.

It is to be understood that the bump stopper 15 does not constitute a structure which would prevent or inhibit deformation given that the bump stopper 15 is formed so that the bump stopper 15 may easily deform as described above.

Multiple traditional vehicle structures such as a suspension tower, second cross member, engine mount bracket, etc. may be arranged to overlap each other along the vehicle's longitudinal direction. However, under this arrangement with traditional vehicle structures, the joints along the main frame where the various vehicle structures (cross members, engine mount bracket, etc.) connect to the main frame would be less apt to deform during a front collision. Accordingly, this traditional prior art design may undesirably cause the value of F2 to excessively or rapidly increase.

Therefore, in this embodiment, the engine mount bracket 27 is spaced apart along the main frame 10 from the suspension tower 101 and the second cross member 12 as well as the third cross member 13. Therefore, the portion of the main frame between the various vehicle structures may deform securely and in a controlled manner during a vehicular front collision, because the various vehicle structure members (cross members, suspension tower, engine mount bracket, etc.) would be arranged in a dispersed manner along the vehicle's longitudinal direction as shown in FIG. 11.

In contrast from an arrangement where the vehicle structure members (suspension tower, engine mount bracket, cross member) overlap one another along the main frame 10, the main frame 10 is more likely to deform and absorb energy where there is only one vehicle structure affixed to the main frame.

As noted, the suspension tower 101 may be bifurcated into a front leg 101a and a rear leg 101b at its lower part, wherein the front leg 101a and the rear leg 101b are spaced apart from each other along the main frame. A lower portion of the front leg 101a and a lower portion of the rear leg 101b are separately attached to the main frame 10 along the vehicle's longitudinal direction. Furthermore, a fragile portion such as a depression 126 or aperture (not shown) may be defined on the main frame 10 at the position between the front leg 101a and the rear leg 101b to further facilitate deformation. Therefore, the portion of the main frame 10 between the front leg 101a and the rear leg 101b may securely deform and absorb energy during vehicular front collision by implementing a fragile portion such as a depression 126 or aperture (not shown). Further, the joint between the engine mount bracket 27 and the main frame 10 can be securely deformed due to the notch 27d formed on the engine mount bracket 27 and the slot 128 formed on the main frame 10. Accordingly, due to controlled deformation of the absorption structures, the desired energy absorption levels may be achieved in the desired areas (away from the passenger cabin area) thereby providing a safer vehicle structure. Given the various options of placing the fragile areas or depressions 126 along the main frame, it would be easy to optimize the impact force to the passenger cabin area given that multiple portions of the main frame 10 can strategically placed in a variety of areas so that the main frame may be deformed in a controlled manner during a front collision.

Figure 13:
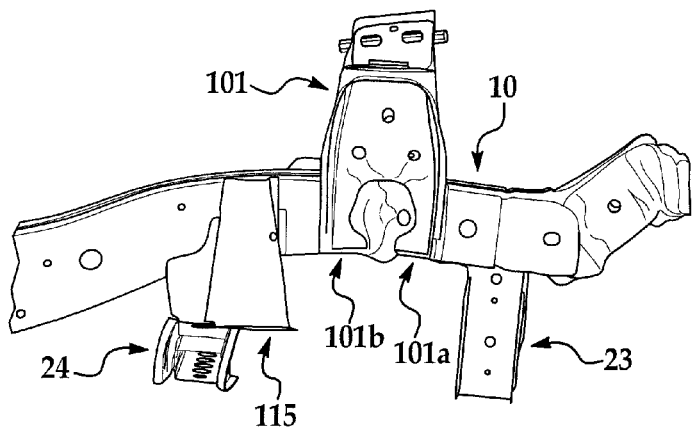
FIG. 13 is a deforming simulation result of the right main frame of the chassis frame during early stage of vehicular front collision, which showing the state of the deformation of the main frame when seen from outer side in the vehicle wide direction.
Figure 16:
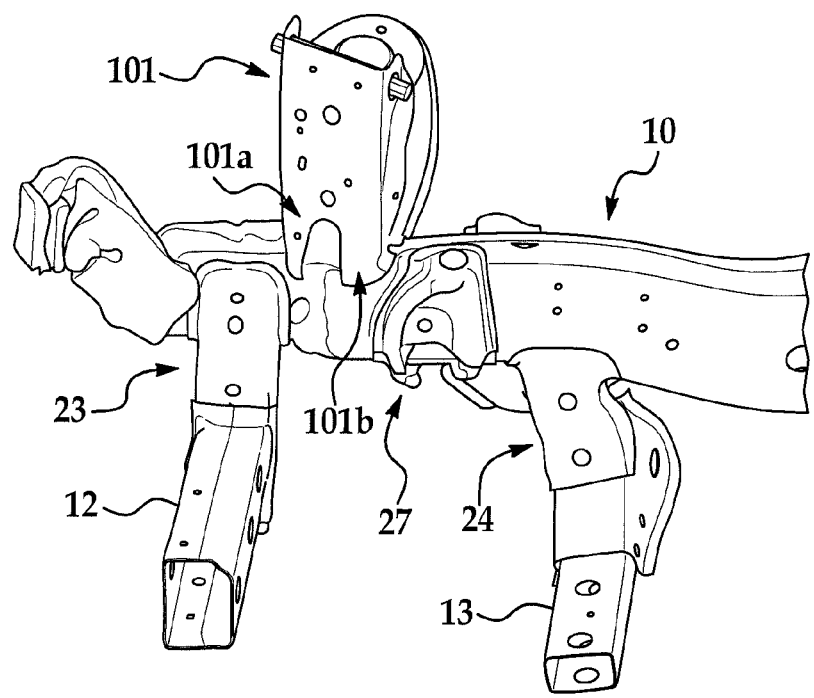
FIG. 16 is a deforming simulation result of the right main frame of the chassis frame during late stage of vehicular front collision, which showing the state of the deformation of the main frame when seen from inner side in the vehicle wide direction.

Here, FIGS. 13 to 16 show a deforming simulation result of the main frame 10 of the chassis frame 9 during the vehicular front collision. The figures show only right-side main frame in view of its visibility, although the simulation is run about the vehicle having all the vehicle components (i.e. various kinds of vehicle parts). FIG. 13 shows a state of the deformation of the right main frame 10 during early stage of vehicular front collision (i.e. during substantially whole portion of the main frame 10 located frontward of the second cross member 12 is compressively deforming) when seen from outer side in the vehicle wide direction. FIG. 14 shows a state of the deformation of the right main frame 10 during an early stage of vehicular front collision when seen from inner side in the vehicle wide direction. FIG. 15 shows a state of the deformation of the right main frame 10 during late stage of vehicular front collision when seen from outer side in the vehicle wide direction. FIG. 16 shows a state of the deformation of the right main frame 10 during late stage of vehicular front collision when seen from inner side in the vehicle wide direction. In FIGS. 13 to 16, depth of color indicates amount of deformation which occurs in the main frame 10, and the color becomes deeper as the deformation increases. Increasing the deformation of the vehicle structure and/or main frame means that the collision energy is absorbed effectively at the portion. It can be appreciated from these FIGS. 13 to 16 that, upon initially impact, the portion of the main frame 10 located frontward of the second cross member 12 is compressively deformed. Secondarily the portion of the main frame 10 between the front leg 101a and the rear leg 101b of the suspension tower 101 and the joint between the main frame 10 and the engine mount bracket 27 deform, and subsequently, these portions continue to deform as time elapses.

The present disclosure should not be limited to the above embodiments, and can be substituted within the scope of following claims.

For example, the suspension tower 101 may not necessarily be bifurcated into a front leg 101a and a rear leg 101b at its lower end, and the lower end of the suspension tower 101 may be attached on the main frame 10 continuously throughout the lower end along the vehicle's longitudinal direction. Therefore, the depression 126 or fragile portion may not necessarily be formed on the main frame 10 between the front leg 101a and the rear leg 101b. Alternatively, the slot 128 defined in the main frame 10 may be omitted.

The above embodiment is merely exemplary, and is not to be interpreted as limiting the scope of the present disclosure. The scope of the present disclosure should be defined by the following claims. All of variation and modification belonging to the equivalent of the following claims should be within the scope of the present disclosure.

What is claimed is:

1. An energy absorbing structure for a vehicle having a chassis frame comprises:
    a left main frame and a right main frame extending in a vehicle longitudinal direction respectively;
    a front cross member connecting the left main frame to the right main frame;
    a rear cross member connecting the left main frame to the right main frame;
    a suspension tower attached to each of the left and right main frames, the suspension tower being provided between the front cross member and the rear cross member in a vehicle longitudinal direction;
    a pair of engine mount brackets attached to the left and right main frames respectively, each of the engine mount brackets being provided between the front cross member and the rear cross member in the vehicle longitudinal direction; wherein
    each of the suspension towers is spaced apart from the front cross member and the rear cross member along each of the left main frame and the right main frame; and
    each of the engine mount brackets is spaced apart from the front cross member, rear cross member, and the suspension tower along each of the left main frame and the right main frame,
    wherein each of the suspension towers is bifurcated into a front leg and a rear leg at a lower end of the suspension tower, the front legs and the rear legs being spaced apart from each other in the vehicle longitudinal direction, and the front leg and the rear leg are separately attached to each main frame in the vehicle longitudinal direction and a depression is defined on a main frame between the front leg and the rear leg.

2. The energy absorbing structure for the vehicle according to claim 1 wherein, each of the engine mount brackets has an upper member and a lower member, the upper member and the lower member being affixed to an inner main frame panel and being substantially perpendicular to the inner main frame panel;
    the upper member and the lower member are each approximately reverse U shape members;
    the upper member and the lower member are operatively configured to attach to each other,
    an elastic mounting attached to an upper side of the upper member,
    a notch defined in the lower member;
    a slot defined in the inner main frame panel, the slot being disposed in a position which overlaps with the each engine mount bracket in the vehicle longitudinal direction.

3. A frontal collision energy absorbing structure for the vehicle according to claim 1 wherein a fragile portion is defined on a main frame between the front leg and the rear leg.

4. A frontal collision energy absorbing structure for the vehicle according to claim 1 wherein a fragile portion is defined on a main frame at a position which overlaps with the engine mount bracket in the vehicle longitudinal direction.

* * * * *